United States Patent [19]
Hogel

[11] 3,807,427
[45] Apr. 30, 1974

[54] MAIN COMPENSATED PRESSURE REGULATING VALVE

[75] Inventor: Joseph E. Hogel, River Grove, Ill.

[73] Assignee: Honeywell, Inc., Minneapolis, Minn.

[22] Filed: Sept. 13, 1971

[21] Appl. No.: 179,864

[52] U.S. Cl............................... 137/115, 137/471
[51] Int. Cl................... F16k 31/145, F16k 31/365
[58] Field of Search .......... 137/102, 109, 115, 116, 137/116.3, 116.5, 118, 119, 111, 112, 114, 117, 509, 510, 471

[56] References Cited
UNITED STATES PATENTS

| 3,217,732 | 11/1965 | Haugeland | 137/117 |
| 3,581,760 | 6/1971 | West | 137/115 |
| 3,343,217 | 9/1967 | Daubenberger | 137/115 |

FOREIGN PATENTS OR APPLICATIONS

| 122,398 | 10/1919 | Great Britain | 137/115 |

Primary Examiner—William R. Cline
Attorney, Agent, or Firm—Lamont B. Koontz; Trevor B. Joike

[57] ABSTRACT

A pressure regulating valve, particularly suitable for use in diaphragm logic circuits having a restriction, an output pressure chamber, a first diaphragm, an adjustable biasing spring, an exhaust nozzle and the improvement comprising a main pressure chamber, a second diaphragm and means interconnecting the first and second diaphragms to alter the position of the first diaphragm in response to a change in main pressure, whereby the regulated output is maintained substantially constant in spite of the variations in the main pressure.

3 Claims, 1 Drawing Figure

PATENTED APR 30 1974 3,807,427
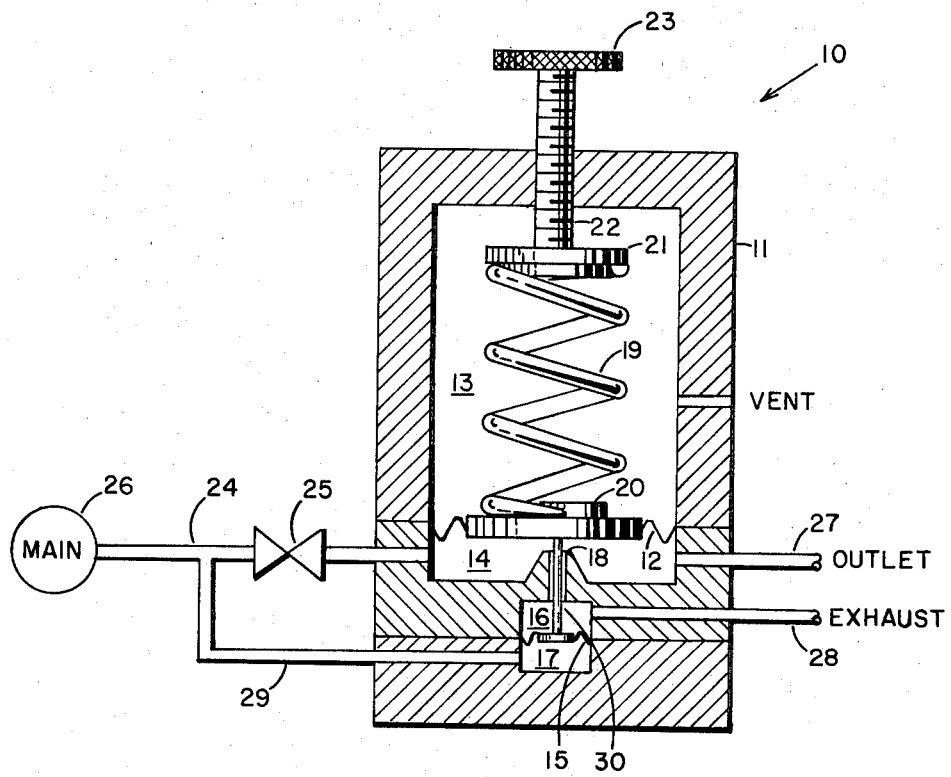
INVENTOR.
JOSEPH E. HOGEL
BY [signature]
ATTORNEY.

MAIN COMPENSATED PRESSURE REGULATING VALVE

BACKGROUND AND SUMMARY OF THE INVENTION

This invention relates to a pressure regulating valve and more particularly to a main compensated pressure regulating valve particularly suitable for use in diaphragm logic circuits.

A typical pressure regulating valve used in diaphragm logic circuits comprises a restricted main pressure inlet, an output pressure chamber, a nozzle which serves as an exhaust, and a spring biased diaphragm which is normally urged against the nozzle. In this arrangement pressure is allowed to build up in the output pressure chamber until the pressure, working against the diaphragm, balances the spring load. At this point the excess pressure is exhausted through the nozzle which results in a regulated output pressure as determined by the spring load. This arrangement works well if the main pressure remains constant. A change in main pressure, however, will result in a new regulated pressure because a change in main pressure is passed through the restriction and is sensed by the output pressure chamber and thus requires the diaphragm above the nozzle to assume a new position. This new position corresponds to a new load from the spring, due to the spring rate; accordingly a new output pressure is required to compensate for the new spring load. This variation in the regulated output as a result of variations in the main can be minimized by employing a very low rate spring, but spring manufacturing limits the minimum rate.

The subject invention provides a means of virtually eliminating variations in the regulated output pressure caused by variations in the main pressure, which does not require the use of a minimum rate spring.

The invention comprises the addition of a second diaphragm and chamber which is placed so as to sense unrestricted main pressure. The force output from this second diaphragm is applied to the main diaphragm. The regulator functions identically to the uncompensated regulator for conditions of a constant main pressure. When a change in main pressure is experienced, the change in the force output of the second diaphragm is applied to the main diaphragm. The effect this has on the regulator is to rebalance the forces on the main diaphragm at a new position over the nozzle without requiring the output pressure to provide the load change. Thus the output pressure remains constant.

Further advantages of the subject invention will become apparent upon a reading of the detailed description of the invention in view of the drawing wherein:

The FIGURE is a schematic illustration of a pressure regulating valve having main compensation.

DETAILED DESCRIPTION OF THE INVENTION

In the drawing the numeral 10 generally designates the main compensated pressure regulating valve of the subject invention. The pressure regulating valve comprises a housing 11 divided by a diaphragm 12 into a first chamber 13 and a second chamber or output pressure chamber 14. A second diaphragm 15 further divides the housing into a third chamber 16 and a fourth chamber or main pressure chamber 17. Interconnecting the second chamber 14 and the third chamber 16 is a nozzle 18.

Associated with the first diaphragm 12 is a biasing means or spring 19. The spring 19 is held between a first plate 20 which forms a part of the diaphragm 12 and a second plate 21 which is attached to a threaded member 22. The threaded member 22 may be manually rotated by knob 23 in order that the force exerted by the spring 19 against the plate 20 of the diaphragm 12 may be selectively varied. Thus rotating the knob 23 results in a changed regulated output pressure.

In communication with the output pressure chamber 14 is a first main pressure inlet 24 including a restriction 25. The inlet 24 is connected to a source of main pressure 26. Also in communication with the second chamber 14 is outlet 27 which provides the regulated output pressure. In communication with the third chamber 16 is an exhaust means or conduit 28. In communication with the main pressure chamber 17 is a second main pressure inlet 29 which is also connected to a source of main pressure 26.

Interposed between the first diaphragm 12 and the second diaphragm 15 is a relatively rigid member 30 which extends through the nozzle means 18. The member 30 transmits movements of the diaphragm 15 caused by variations in the main pressure to the diaphragm 12.

In operation, when the main pressure is constant, the pressure regulating valve 10 operates substantially like a non-compensated pressure regulating valve. Pressure from the source 26 is allowed to build up in the chamber 14 until the force of the spring 19 is balanced by the pressure in the chamber whereafter the excess pressure is bled through the nozzle 18 and out the exhaust means 28. During this sequence of events there is a force exerted upwardly on the first diaphragm 12 by member 30 due to the main pressure in the fourth chamber 17. This force should be exactly cancelled by incorporating a pre-load in the spring 19.

If there occurs a change in the main pressure from the source 26, say an increase, the position of diaphragm 12 must change in order for the spring force and the pressure in the chamber 14 to balance. Accordingly diaphragm 12 must move upwardly; the new position will result in an additional force exerted by the spring due to the inherent spring rate of the spring. In a normal pressure regulating valve this additional force would have to be overcome by a greater output pressure. In the pressure regulating valve 10, however, the additional force required is provided by means of the member 30 and the diaphragm 15 responding to the increased main pressure. Thus the regulated output pressure is allowed to remain substantially constant in spite of the variation in the main pressure.

The working area of the diaphragm 15 must be carefully determined in order for changes in the main pressure to be exactly compensated. Of course, if it is desired changes in the main pressure may be over-compensated or under-compensated. The size of the working area of the diaphragm 15 has been found to be a function of the spring rate of the spring 19 and of the gain of the nozzle 18. The higher the spring rate of the spring 19, or the higher the gain of the nozzle 18, the greater must be the working area of the diaphragm 15. The gain of the nozzle is, of course, a function of the restriction and of certain nozzle parameters as is well known in the art.

While only a single detailed embodiment of the subject invention has been disclosed herein, it is intended that the scope of the invention be limited only by the scope of the appended claims.

The embodiments of the invention in which an exclusive property or right is claimed are defined as follows:

1. A pressure regulating valve comprising:
   housing means;
   first diaphragm means dividing the housing means into first and second chambers;
   second diaphragm means dividing the housing into third and fourth chambers;
   nozzle means interconnecting the second and third chambers;
   spring means associated with the first chamber and arranged to urge the first diaphragm means against the nozzle means to thereby cut-off communication between the second and third chambers;
   a first main pressure inlet, including a restriction, connected to the second chamber;
   a second main pressure inlet connected to the fourth chamber;
   a regulated pressure outlet connected to the second chamber;
   exhaust means connected to the third chamber;
   means associated with the second diaphragm means responsive to changes in the forces on the second diaphragm means caused by changes in the main pressure and arranged to alter the force balance of the first diaphragm means to compensate for said changes in the main pressure, whereby the regulated output pressure of the pressure regulating valve is maintained substantially constant in spite of said changes in the main pressure.

2. The invention according to claim 1 wherein the spring means is manually adjustable to selectively determine the regulated output pressure.

3. The invention according to claim 1 wherein the means associated with the second diaphragm means comprises a substantially rigid member extending through the nozzle means between the second and third chambers and arranged to transmit movements of the second diaphragm means to the first diaphragm means to thereby alter the position of the first diaphragm means.

* * * * *